United States Patent
Courcy

Patent Number: 5,361,870
Date of Patent: Nov. 8, 1994

[54] TRANSMISSION FLUID EXCHANGE APPARATUS

[76] Inventor: Richard R. Courcy, 12 Girard Way, Newbury, Mass. 01951

[21] Appl. No.: 120,056

[22] Filed: Sep. 13, 1993

[51] Int. Cl.⁵ .......................... F16C 3/14; F16N 33/00
[52] U.S. Cl. ...................................... 184/1.5; 184/29; 184/41; 184/105.1; 184/108; 222/249; 222/334; 222/386.5
[58] Field of Search ....................... 184/1.5, 28, 29, 39, 184/41, 105.1, 108; 141/27, 24, 25, 26, 27; 222/41, 47, 49, 249, 334, 389, 386.5

[56] References Cited

U.S. PATENT DOCUMENTS

| | | | |
|---|---|---|---|
| 1,630,899 | 5/1927 | Lynch | 184/39 |
| 3,112,845 | 12/1963 | Bryant | 222/249 |
| 3,223,291 | 12/1965 | Thomas | 222/249 |
| 3,370,759 | 2/1968 | Johansson | 22/249 |
| 3,513,941 | 5/1970 | Becnel | 184/1.5 |
| 3,565,287 | 2/1971 | Johnston | 222/249 |
| 4,438,872 | 3/1984 | Dooley et al. | 222/334 |
| 4,745,989 | 5/1988 | DiMatteo | 184/1.5 |

FOREIGN PATENT DOCUMENTS

| | | | |
|---|---|---|---|
| 0072299 | 3/1990 | Japan | 184/1.5 |

Primary Examiner—Thomas E. Denion
Attorney, Agent, or Firm—E. Michael Combs

[57] ABSTRACT

A tank structure is arranged to include a piston within the tank structure to divide the tank to a first and second chamber, wherein the first chamber is arranged to receive used transmission fluid and simultaneously direct fresh transmission fluid into an associated transmission pressure line.

5 Claims, 4 Drawing Sheets

TRANSMISSION FLUID EXCHANGE APPARATUS

BACKGROUND OF THE INVENTION

1. Field of the Invention the field of invention relates to transmission and transmission fluid transport structure, and more particularly pertains to a new and improved transmission fluid exchange apparatus wherein the same is arranged to permit the ease replenishment of transmission fluid within an automatic transmission having a pressure conduit.

2. Description of the Prior Art fluid supply systems of various types are utilized in the prior art relative to vehicles and the like such as indicated in U.S. Pat. Nos. 5,069,037; 4,745,989; 4,869,346; 5,044,344; and 3,513,941.

The U.S. Pat. No. 3,513,941 indicates a fluid change means for automatic transmissions permitting the replenishment and exchange of fluid.

The instant invention attempts to overcome deficiencies of such prior art by providing for a structure of enhanced ease of use and simplicity of construction not contemplated by the prior art and in this respect, the present invention substantially fulfills this need.

SUMMARY OF THE INVENTION

In view of the foregoing disadvantages inherent in the known types of transmission fluid exchange apparatus now present in the prior art, the present invention provides a transmission fluid exchange apparatus wherein the same is directed to the exchange of fluid relative to an automatic transmission. As such, the general purpose of the present invention, which will be described subsequently in greater detail, is to provide a new and improved transmission fluid exchange apparatus which has all the advantages of the prior art transmission fluid exchange apparatus and none of the disadvantages.

To attain this, the present invention provides a tank structure arranged to include a piston within the tank structure to divide the tank to a first and second chamber, wherein the first chamber is arranged to receive used transmission fluid and simultaneously direct fresh transmission fluid into an associated transmission pressure line.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved transmission fluid exchange apparatus which has all the advantages of the prior art transmission fluid exchange apparatus and none of the disadvantages.

It is another object of the present invention to provide a new and improved transmission fluid exchange apparatus which may be easily and efficiently manufactured and marketed.

It is a further object of the present invention to provide a new and improved transmission fluid exchange apparatus which is of a durable and reliable construction.

An even further object of the present invention is to provide a new and improved transmission fluid exchange apparatus which is susceptible of a low cost of manufacture with regard to both materials and labor, and which accordingly is then susceptible of low prices of sale to the consuming public, thereby making such transmission fluid exchange apparatus economically available to the buying public.

Still yet another object of the present invention is to provide a new and improved transmission fluid exchange apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
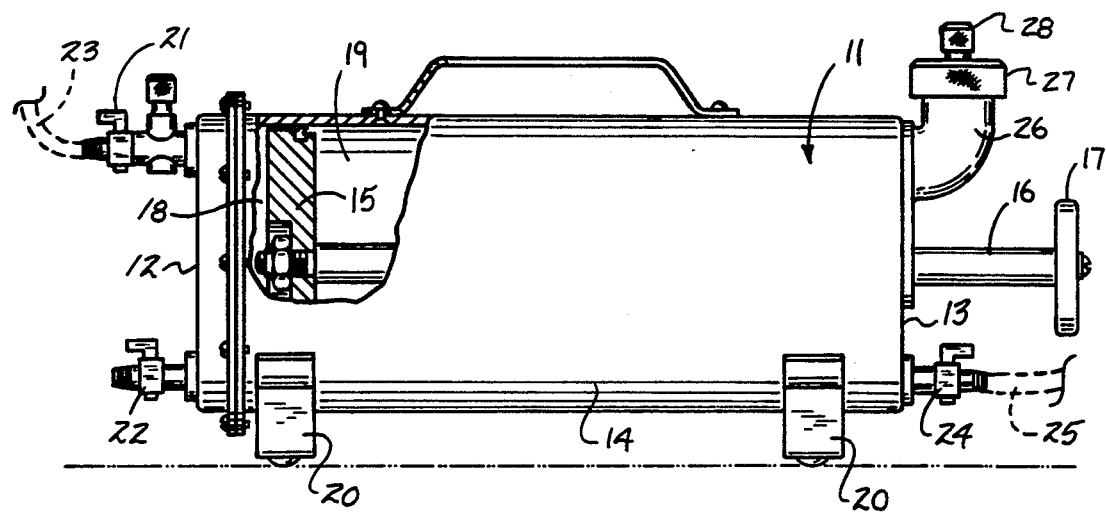
FIG. 1 is an orthographic side view of the invention.
Figure 2:
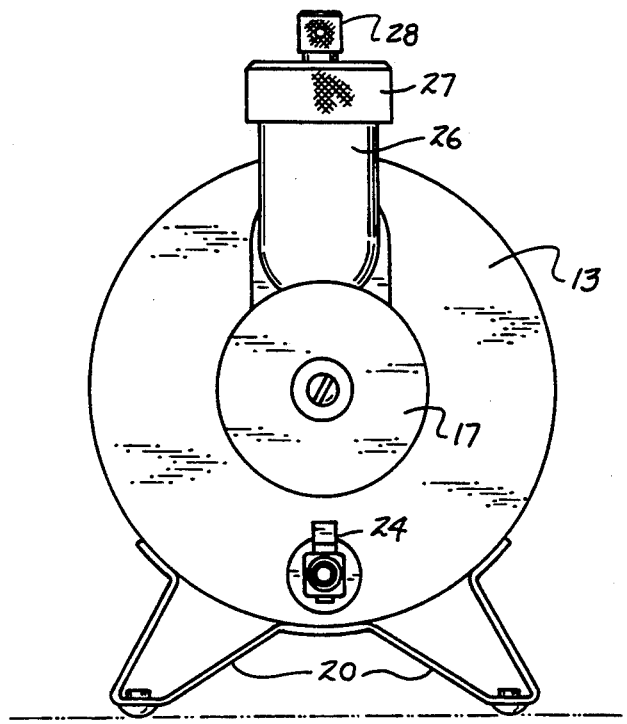
FIG. 2 is an orthographic end view of the invention.

With reference now to the drawings, and in particular to FIGS. 1 to 8 thereof, a new and improved transmission fluid exchange apparatus embodying the principles and concepts of the present invention and generally designated by the reference numerals 11–44 will be described.

Figure 3:
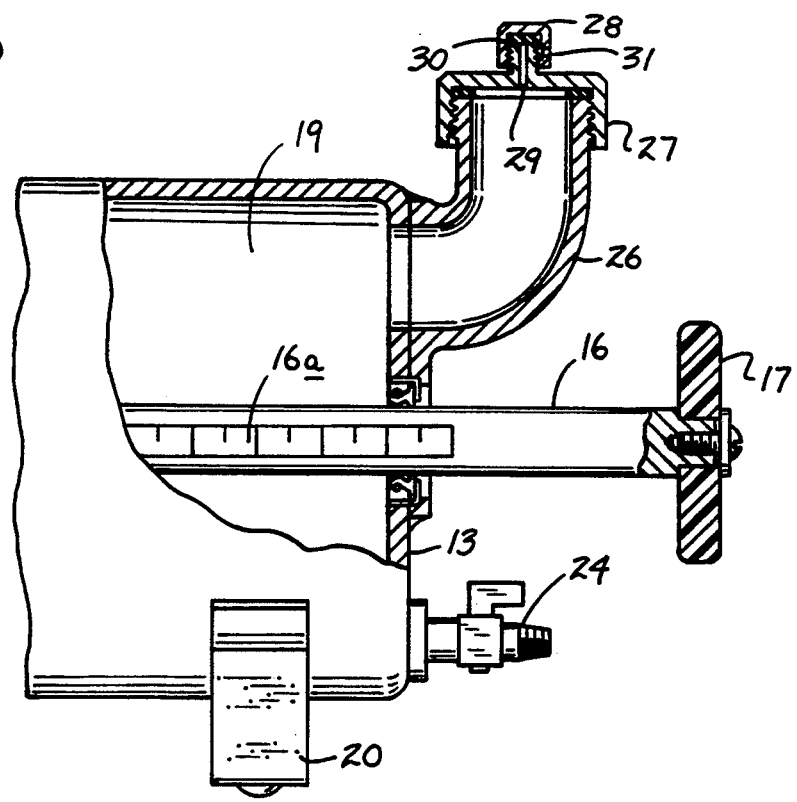
FIG. 3 is an orthographic view, partially in section, of the second end wall structure of the invention.
Figure 4:
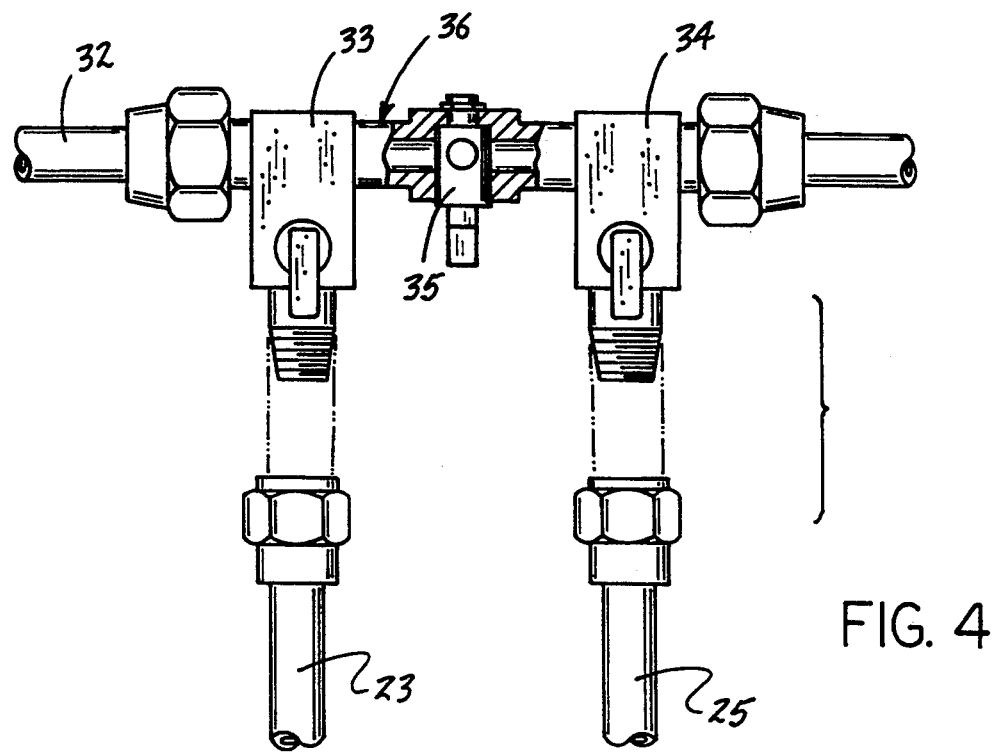
FIG. 4 is an orthographic top view of the valve assembly employed relative to the transmission pressure line for use by the invention.

More specifically, the transmission fluid exchange apparatus of the invention essentially comprises a container tank 11 having a first end wall 12 spaced from a second end wall 13, with a surrounding side wall 14. A piston 15 is slidably directed between the first and second end walls, having a piston rod 16 fixedly and coaxially mounted to the piston 15, with the piston rod 16 directed through and in a sealed sliding relationship of the second end wall 13 terminating in a rod handle 17 exteriorly of the container tank and the second end wall 13. As illustrated in FIG. 3, rod graduations 16a are indicated along an exterior surface of the piston rod 16 for indicating various incremental fluid directed from the container tank 11, and more specifically, the second chamber 19 oriented between the piston 15 and the second end wall, such that a first chamber 18 is oriented between the first end wall 12 and the piston 15. A fill valve 21 is directed through the first end wall at an uppermost end thereof, such that a drain valve 22 is mounted to the second end wall and directed therethrough in communication with the first chamber 18. The drain valve 22 permits the removal of transmission fluid directed into the first chamber, with the fill valve 2 arranged to receive such transmission fluid from an inlet conduit 23 mounted to a pressure conduit 32 (see FIG. 4) of an associated vehicular automatic transmission. The fill valve accordingly is at an uppermost end of the first end wall such that the drain valve 22 is at a lowermost end thereof in adjacency to the support legs 20 mounted to the side wall 14. The second end wall 13 includes an outlet valve 24 mounted in fluid communication to an outlet conduit 25, that in turn is secured in fluid communication with the pressure conduit 32 of the associated automatic transmission as noted above through the valve assembly 36, as indicated in FIG. 4. A fill tube 26 is directed through the second end wall adjacent an uppermost end of the second end wall diametrically opposed relative to the outlet valve 24, that in turn is positioned at a lowermost end of the second end wall in adjacency to the support legs 20. A fill tube 26 is arranged to permit replenishment of fresh transmission fluid within the second chamber for its projection through the outlet valve 24 and the outlet conduit 25. To this end, the fill tube 26 includes a fill cap 27 having an air bleed valve 28. The air bleed valve 28 includes a first air conduit 29 in pneumatic communication with the fill tube 26 in pneumatic communication to a second air conduit 31 directed through a side wall of the air bleed valve 28, with the first and second air conduits 29 and 31 in communication relative to one another through an air permeable cover 30.

The valve assembly 36 includes a first valve 33 spaced from a second valve 34, having an intermediate valve 35 intermediate the first and second valves 33 and 34. To utilize the invention, the valve assembly 36 is mounted to the transmission pressure conduit 32, where the first and second valves 33 and 34 are opened and the intermediate valve 35 is closed preventing fluid flow through the pressure conduit 32 and only into the inlet conduit 23 and receiving fresh transmission fluid from the outlet conduit 25 relative to the container tank 11, in a manner described above.

Figure 5:
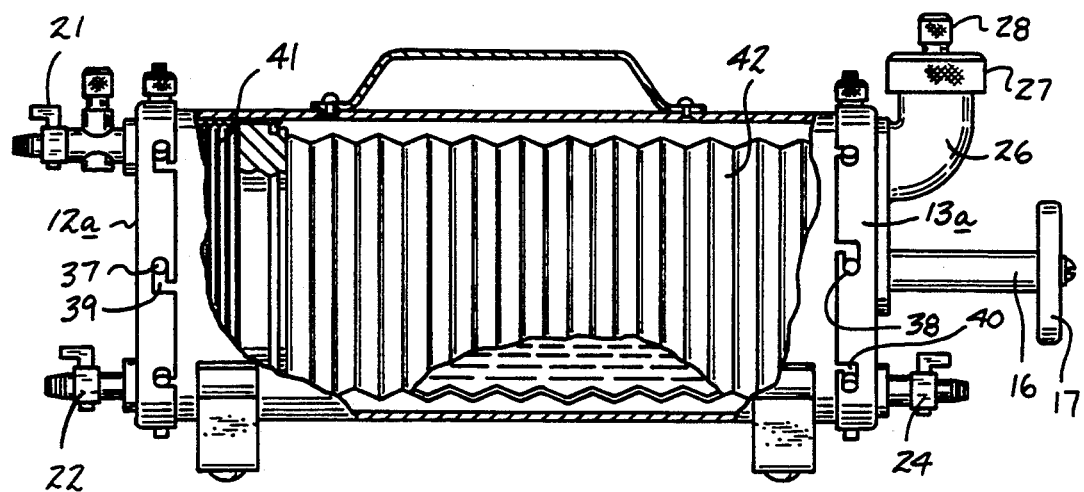
FIG. 5 is an orthographic side view, partially in section, of the first and second chambers including collapsible and replaceable containers.
Figure 6:
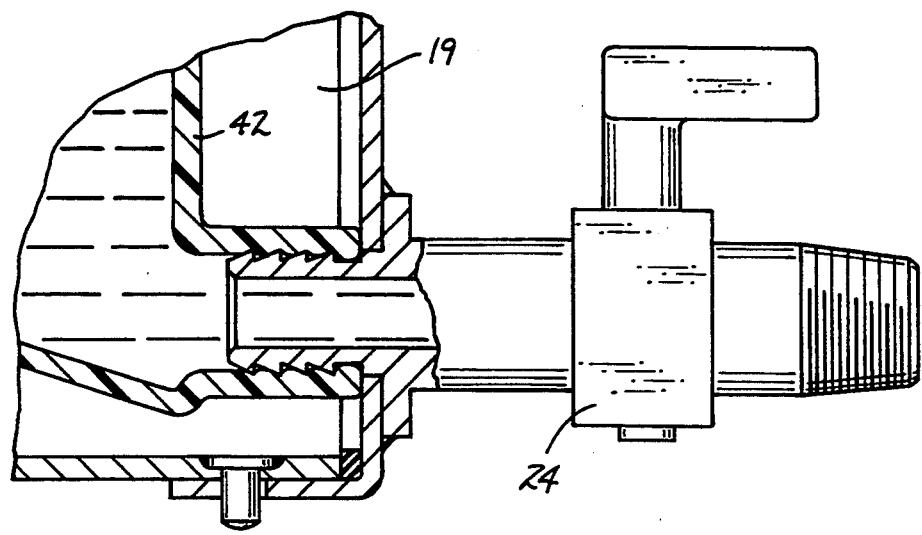
FIG. 6 is an enlarged orthographic view of the second container mounted in association with the outlet valve through the second end wall.

The FIG. 5 is arranged to include the use of removable first and second end walls 12a and 13a, having respective first and second lock lugs 37 and 38 mounted in adjacency to the first and second removable end walls 12a and 13a respectively, with the first and second lock lugs 37 and 38 received within respective first and second L-shaped slots 39 and 40 of respective first and second annular skirts of the first and second removable end walls 12a and 13a, in a manner as indicated in FIG. 5. The first and second respective chambers 18 and 19 receive respective first arid second chamber accordion pleated bags 41 and 42. The second chamber accordion pleated bag 42 has a U-shaped configuration defined by a radial slot 43 (see FIG. 7) directed radially of the bag to permit sliding and reception of the piston rod 16 therethrough. The accordion pleated bags permit the first chamber to fill with fluid, while the second chamber expresses fluid therefrom, wherein the bags permit ease of convenient and ecologically desirable manners of positioning and removing transmission fluid relative to the container tank 11.

Figure 7:
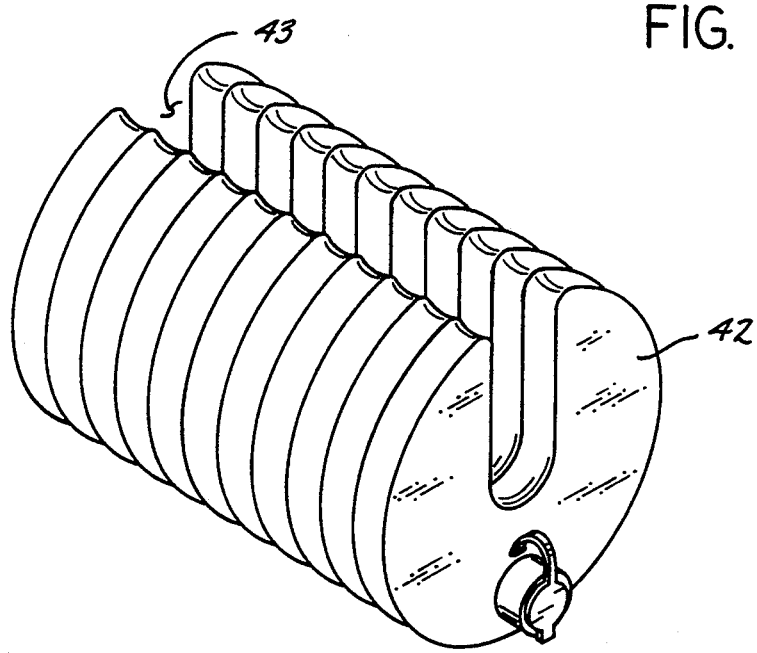
FIG. 7 is an enlarged isometric illustration of the second container structure.
Figure 8:
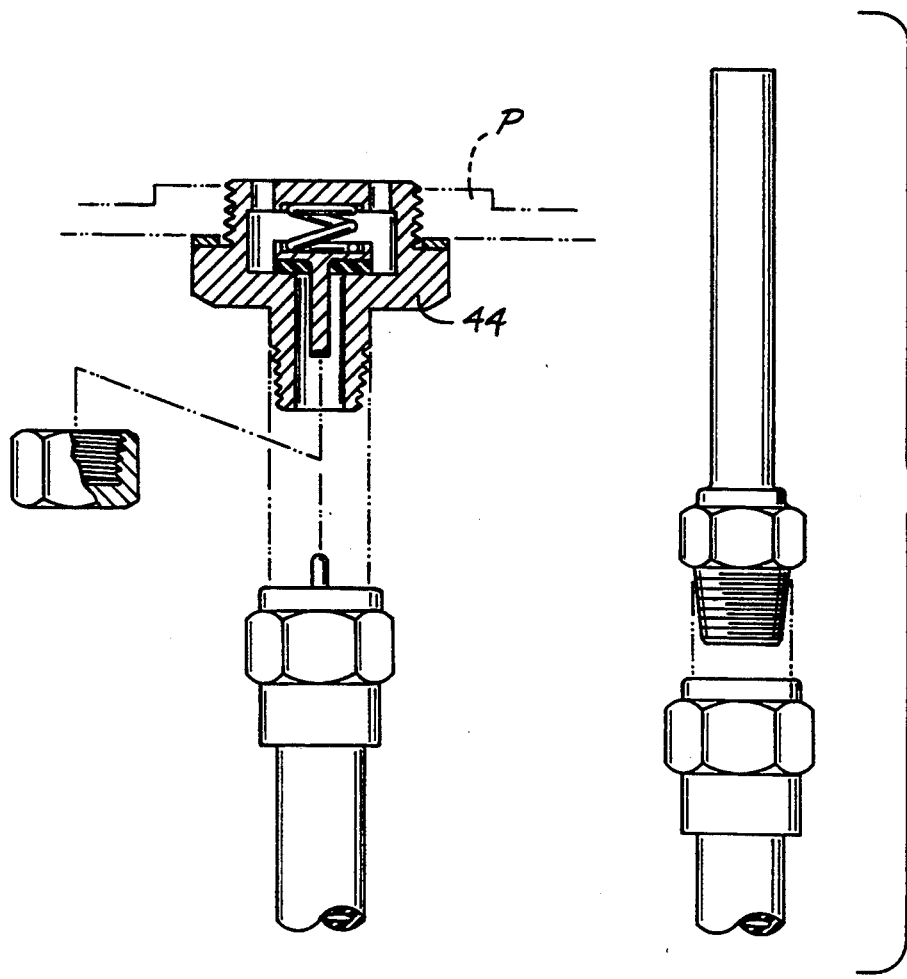
FIG. 8 is an enlarged orthographic view, partially in section, of additional accessories for use in changing engine oil relative to an internal combustion engine.

The FIGS. 7 and 8 indicate the organization arranged for mounting to the drain pan "P" of the associated transmission, having an oil pan plug valve 44 mounted within the oil pan plug opening, with a further tube indicated to the right thereof in the illustration of FIG. 8 to be positioned within the fill tube of the transmission. The shortcomings of this structure requires the use of a pump inasmuch as the transmission pump is not employed, and accordingly an external pump must be required in use of such accessory structure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A transmission fluid exchange apparatus, comprising,
    a container tank, having a first end wall spaced from a second end wall, and a side wall coextensive between the first end wall and the second end wall, the container tank including a piston positioned sealingly therewithin extending in a sliding relationship between the first end wall and the second end wall, the piston including a piston rod mounted fixedly and orthogonally relative to the piston, with the piston rod extending slidingly through the second end wall, the rod including a rod handle mounted to the piston rod positioned exteriorly of the container tank and the second end wall, and a first chamber defined between the piston and the first end wall within the container tank, and a second chamber defined with the container tank between the piston and the second end wall, and support legs mounted at a lowermost end of the container tank, and a fill valve directed into the container tank through the first end wall at an uppermost end of the first end wall, with a lowermost end of the first end wall including a drain valve, and an inlet conduit mounted to the fill valve, the inlet conduit arranged for fluid communication with a transmission pressure conduit, and the second end wall having an outlet valve, the outlet valve including an outlet conduit in fluid communication to the transmission pressure conduit, and the outlet conduit mounted at a lowermost end of the second end wall, with an uppermost end of the second end wall having a fill tube.

2. An apparatus as set forth in claim 1 wherein the fill tube includes a fill tube cap, the fill tube cap including an air bleed valve mounted thereon.

3. An apparatus as set forth in claim 2 wherein the air bleed valve includes a first air conduit within the air bleed valve in pneumatic communication with the fill tube through the fill tube cap, and an air permeable cover mounted in contiguous communication with the air conduit, with a second air conduit directed in pneumatic communication to the air permeable cover through an air bleed valve side wall.

4. An apparatus as set forth in claim 3 wherein said first end wall includes a first end wall skirt, said second end wall includes a second end wall skirt, said first end wall skirt includes an annular array of first L-shaped slots, said second end wall skirt includes an annular array of second L-shaped slots, with said container tank including an annular array of first lock lugs mounted to the container tank in adjacency to said first end wail for reception within said first L-shaped slots, and said container tank including an annular array of second lock lugs mounted to the container tank in adjacency to said second end wall for reception within said second L-shaped slots.

5. An apparatus as set forth in claim 4 wherein said first chamber includes a first chamber accordion pleated bag arranged for fluid communication with said fill valve and said drain valve, and a second chamber accordion pleated bag having a U-shaped configuration, wherein said U-shaped configuration includes a radial slot, said second chamber accordion pleated bag is mounted within said second chamber, with said radial slot receiving said piston rod slidingly therethrough.

* * * * *